(12) United States Patent
Gajdel et al.

(10) Patent No.: US 7,229,179 B2
(45) Date of Patent: Jun. 12, 2007

(54) PRISM FOR VIEWING THE BACKSIDE OF ONE'S OWN HUMAN BODY, HAIR OR CLOTHING

(76) Inventors: John J. Gajdel, 4126 College Ave., Des Moines, IA (US) 50311; Jesse D. Wolf, 6514 S. 93, East Ave., Apt A, Tulsa, OK (US) 74133

( * ) Notice: Subject to any disclaimer, the term of this patent is extended or adjusted under 35 U.S.C. 154(b) by 0 days.

(21) Appl. No.: 10/355,927

(22) Filed: Jan. 31, 2003

(65) Prior Publication Data
US 2004/0027693 A1 Feb. 12, 2004

Related U.S. Application Data

(60) Provisional application No. 60/354,607, filed on Feb. 6, 2002.

(51) Int. Cl.
*G02B 5/08* (2006.01)
*A47G 1/24* (2006.01)

(52) U.S. Cl. ........................ 359/860; 248/476
(58) Field of Classification Search ................ 359/834, 359/838, 840, 850, 855, 856, 857, 860, 861; 248/476; 472/63
See application file for complete search history.

(56) References Cited

U.S. PATENT DOCUMENTS

| | | | | | |
|---|---|---|---|---|---|
| 226,362 | A | * | 4/1880 | Short | 359/860 |
| 518,382 | A | * | 4/1894 | Wiederer | 359/854 |
| 1,612,100 | A | * | 12/1926 | Dailey | 40/442 |
| 1,969,910 | A | * | 8/1934 | Simjian | 359/860 |
| 4,268,121 | A | * | 5/1981 | Peskin | 359/856 |
| 4,775,231 | A | * | 10/1988 | Granzow et al. | 359/860 |
| 5,287,909 | A | * | 2/1994 | King et al. | 160/135 |
| 5,399,008 | A | * | 3/1995 | Vann, Jr. | 312/227 |

* cited by examiner

*Primary Examiner*—Alessandro Amari
(74) *Attorney, Agent, or Firm*—McKee, Voorhees & Sease, P.L.C.

(57) ABSTRACT

A four sided prism which provides the full scale front view and the full scale backside of one's own self. In addition, oblique front and rear views of one's own body, clothing or hair are available. Rigid frames allow for fast assembly without hand tools. The prism can be assembled as a fixed frame prism. The prism can be manufactured so as to allow for folding the frame into a thin cabinet for storage against a wall.

3 Claims, 7 Drawing Sheets

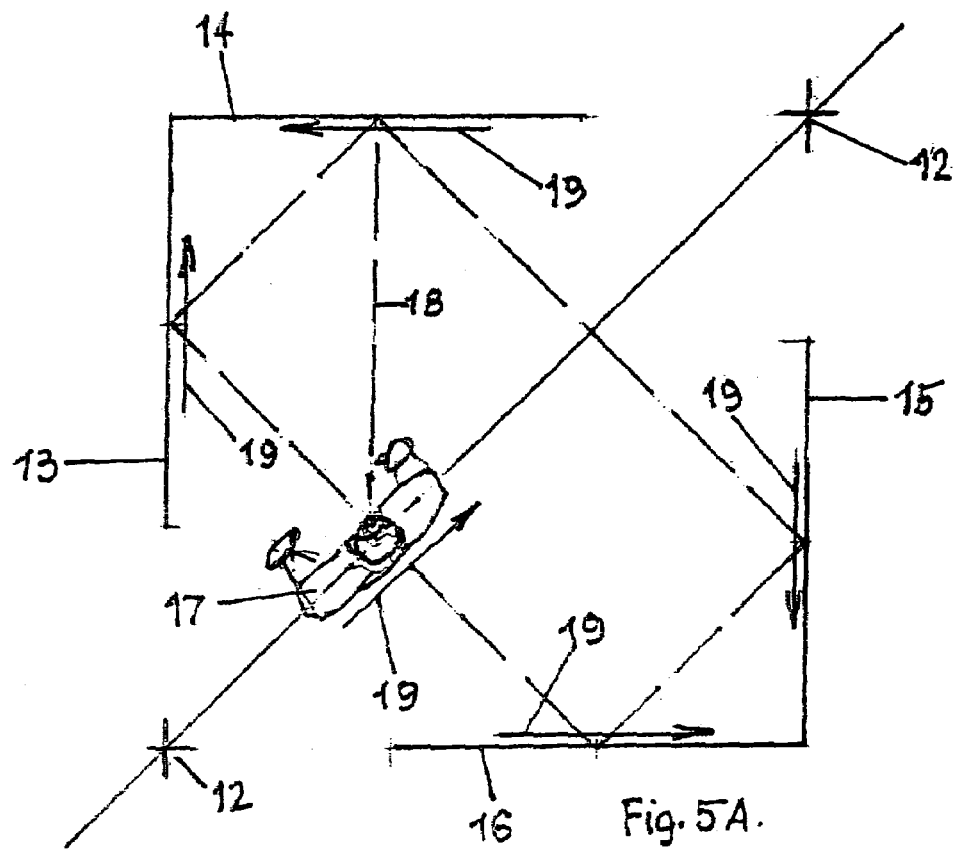
Fig. 5A.
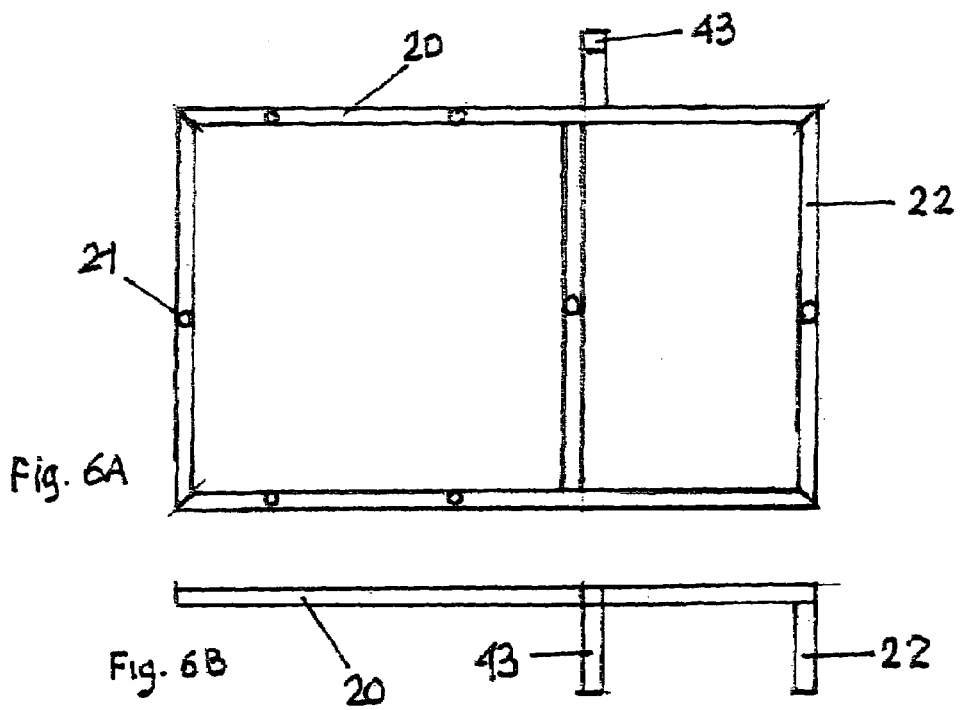
Fig. 6A
Fig. 6B

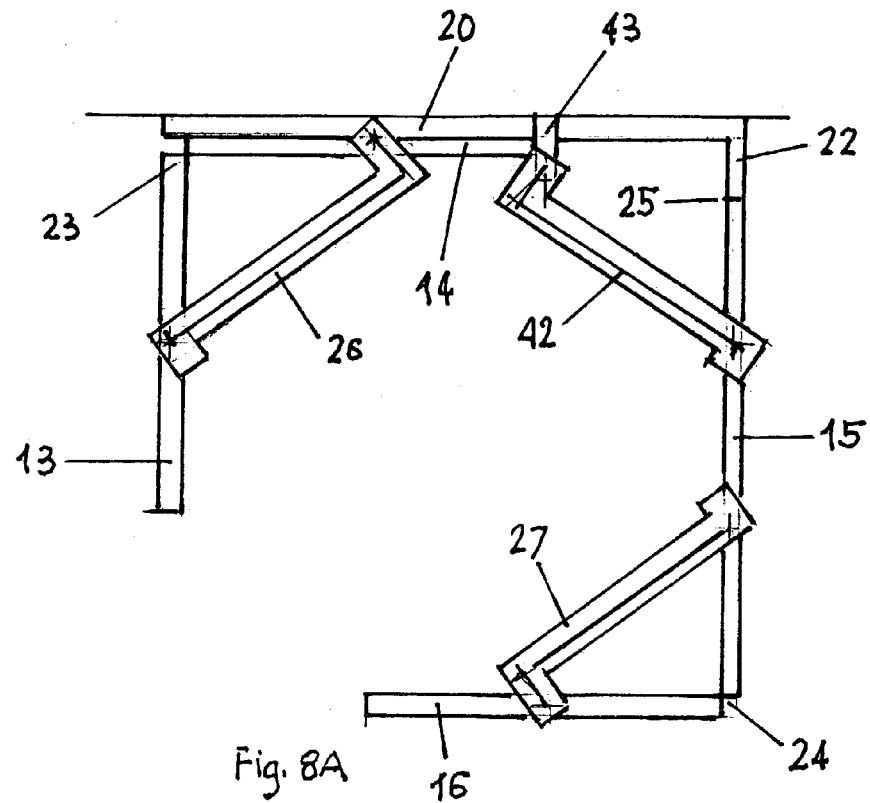
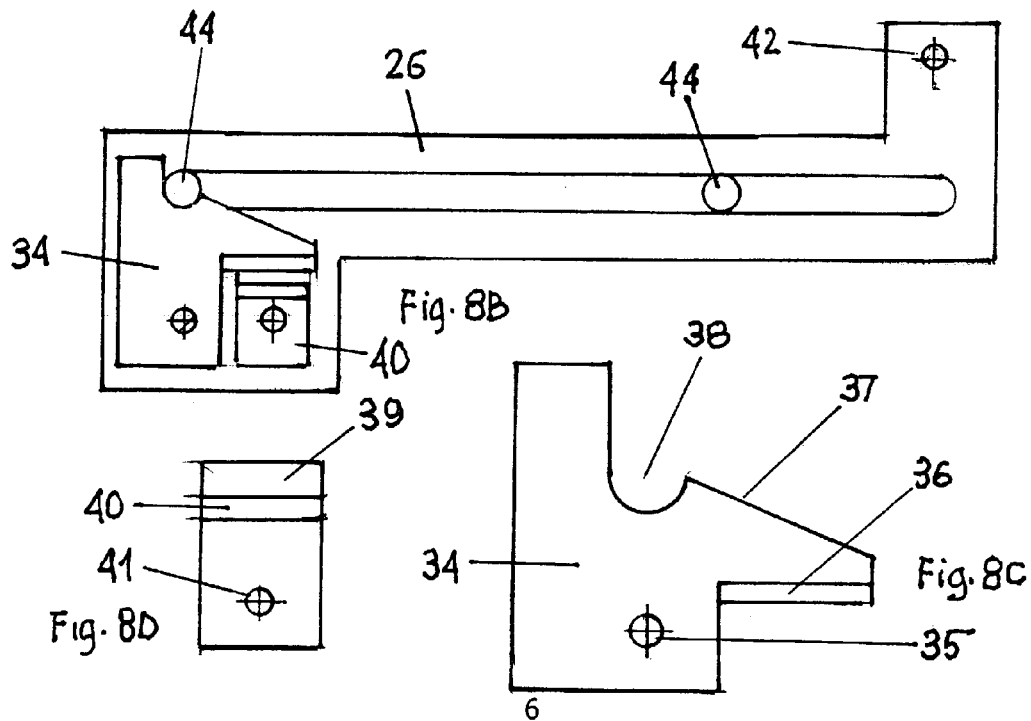

PRISM FOR VIEWING THE BACKSIDE OF ONE'S OWN HUMAN BODY, HAIR OR CLOTHING

PROVISIONAL PATENT APPLICATION

This invention was the subject of a Provisional Patent Application, application No. 60/354,607, filed on Feb. 6, 2002. The Filing Receipt is attached as Exhibit A, for reference.

FEDERALLY SPONSORED RESEARCH

Not applicable

SEQUENCE LISTING OR PROGRAM

Not applicable

BACKGROUND

1. Field of Invention

This invention relates to a four sided prism for the viewing of one's own backside, as well as the normal frontal view and including oblique front and back views, and which prism can be constructed as a fixed structure or as a folding structure for saving floor space.

2. Description of Prior Art

For centuries mirrors have been used to reflect the frontal image of the viewer. Sometimes a viewer placed a mirror at their backside and in a position to reflect this oblique view into a mirror being held in front of them. In recent years mirrors have been provided in three connected frames to provide oblique front and side views. In some specialty stores such as wedding gown departments mirrors have been placed on four walls of a small room to provide oblique front and rear views and a full front view. These small rooms with their interior walls covered with mirrors were not constructed as prisms. That is, they do not provide precise alignment of the reflective surfaces. The result is the front, oblique and rear views of the viewer are distorted.

U.S. Pat. No. 226,362 was issued to Short showing four mirrors arranged in a horizontal pattern, with the bottom two mirrors requiring adjustment in order for any person of a height different than the previous viewer to see their backside. The mirrors presented in the patent drawings would require a person of a different height than the previous viewer to adjust the bottom two mirrors to see the top one third of their backside. The viewer would be required to adjust the bottom two mirrors in order to see the middle section of their backside. The viewer would then be required to adjust the bottom two mirrors to see the lower bottom one third of their backside. This patent does not provide any oblique view of the front or backside of the viewer. This patent to Short covers an adjustable mirror array which, at best, requires many difficult adjustments by the viewer, and may require the assistance of two persons to adjust the mirrors for partial scanning of the backside of the viewer. The patent reveals a system which requires installation in a fixed box, or portion of a home. All this at considerable cost of space and time requirements.

U.S. Pat. No. 370,623 to Hooker, U.S. Pat. No. 505,127 to Ranger, U.S. Pat. No. 533,167 to Fuller, U.S. Pat. No. 1,969,910 to Simjian, U.S. Pat. No. 2,379,214 to Bolinger, U.S. Pat. No. 4,050,790 to Jorwa, U.S. Pat. No. 6,252,730 to Chabot, and U.S. Pat. No. 6,322,222 to Kobayashi all present an array of mirrors which offer some type of at least partial view of the backside of the viewer.

All the reflective mirror or prism systems known to this date suffer from a number of disadvantages.

(a) They do not offer a full scale image of the front, the backside, the oblique front and the oblique backside image of the viewer. Our patent provides this.

(b) They offer no manufacturing system that allows total prefabrication so that on-site installation can be completed in a manner of minutes by one or two persons. Our patent provides this.

(c) They offer no indication of being suitable for mass marketing to the several million up-scale homes which qualify in space and financial status for such an appliance. None have reached any status as a mass produced commercial product. Our patent has survived a nation wide market analysis and manufacturing is being prepared to permit sale to homeowners nationwide.

(d) They offer no indication of being suitable for mass marketing to the several hundred thousand clothing stores which will find this appliance of immediate value to their sales activities. Our patent has survived a nationwide market analysis and manufacturing is being prepared to permit sale to clothing and department store operators nationwide.

(e) They indicate no ability to be disassembled as quickly as assembled and moved a short or a great distance for re-assembly in a precision alignment status. Especially by one or two persons with no technical skills in such assembly procedures. Our patent provides this flexibility.

(f) They do not indicate any feature which allows for construction of the prism with hinges so the system can be folded against a wall and covered by a cabinet for appearance and for floor space conversation. Our patent provides this advantage.

Objects and Advantages

Accordingly, besides the objects and advantages of the precision prism described in our above patent, several objects and advantages of the present invention are:

(a) A prism of such scale that a full sized person can walk into the interior of the prism and review full scale images of their front, their back side, and oblique front and oblique backside views without any adjustments of the prism.

(b) A prism constructed of metal components for the frame, with mounts for the reflective surfaces, and which maintain perfect flat alignment of the reflective surfaces in their respective mounts, and maintain perfect alignment of the relationship of one reflective surface to each and any of the other reflective surfaces.

(c) A prism which is assembled so that in the fixed model the prism can be assembled by one or two persons, in minutes, without use of any hand tools.

(d) A prism which is assembled so that the fixed model the prism can be surrounded by walls of a home or retail store without distorting the alignment of the prism frame.

(e) A prism which is assembled so that in the folding model the prism can be attached to a wall and enclosed with a cabinet by one or two persons, in minutes, with minimum hand tools, (f) A prism, fixed or folding, which can be disassembled, moved and reassembled easily, and remain in perfect alignment.

Further objects and advantages are to provide an appliance for viewing one's own backside which can be used as simply and conveniently as a flat mirror, which is relative inexpensive to manufacture, which is extremely simple for anyone to assemble, and requires no adjustment at the time of set-up or during use. Still further objects and advantages of our invention will become apparent from consideration of the drawings and ensuing description.

SUMMARY

In accordance with the present invention a prism which provides full scale images of the front, the backside, the oblique front and the oblique backside of the viewer. The invention is simple in assembly, does not permit or require adjustments, and is accurate in both front and rear view images.

DRAWINGS

Drawing Figures

In the drawings, closely related figures have the same number but different alphabetic suffixes.

Figure 5B:
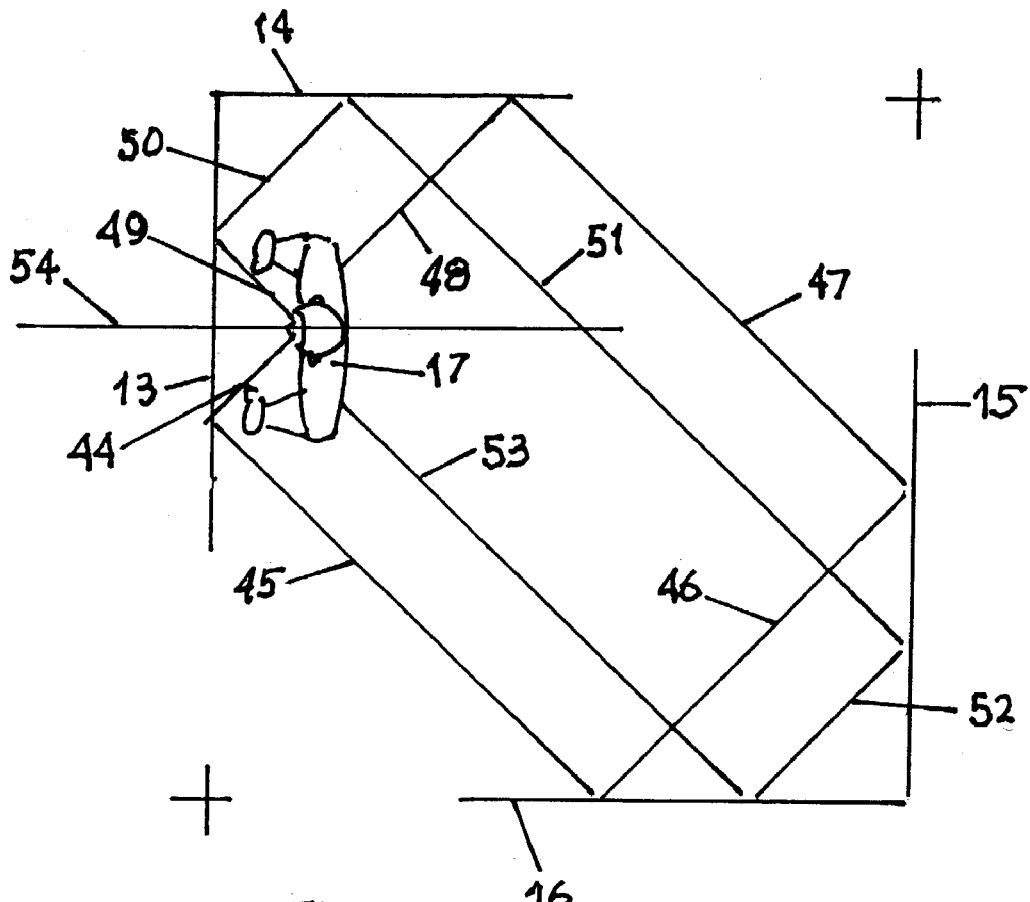
FIG. 5B shows the oblique rear views
Figure 5C:
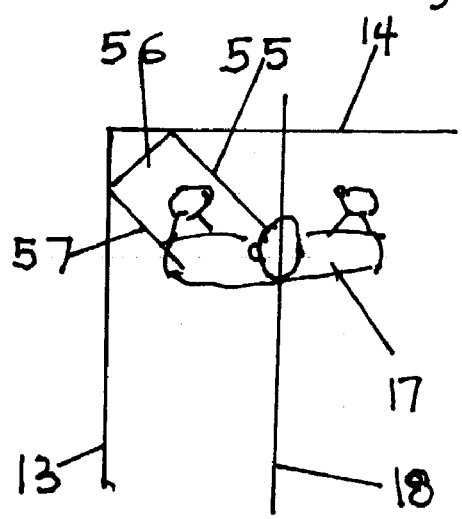
FIG. 5A is a simplified plan view of the prism system

FIG. 5C—shows the front left oblique view

Figure 5D:
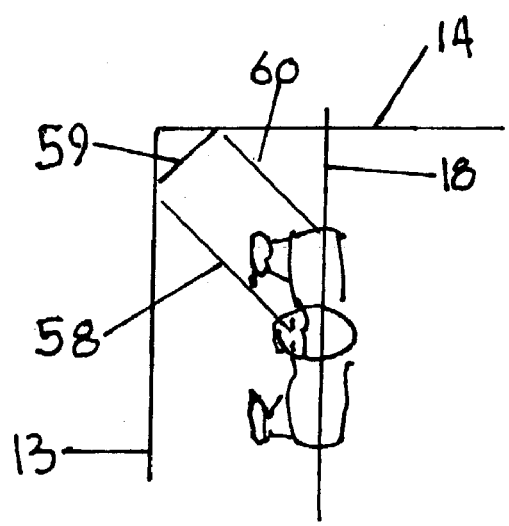

FIG. 5D—shows the front right oblique view

Figure 5E:
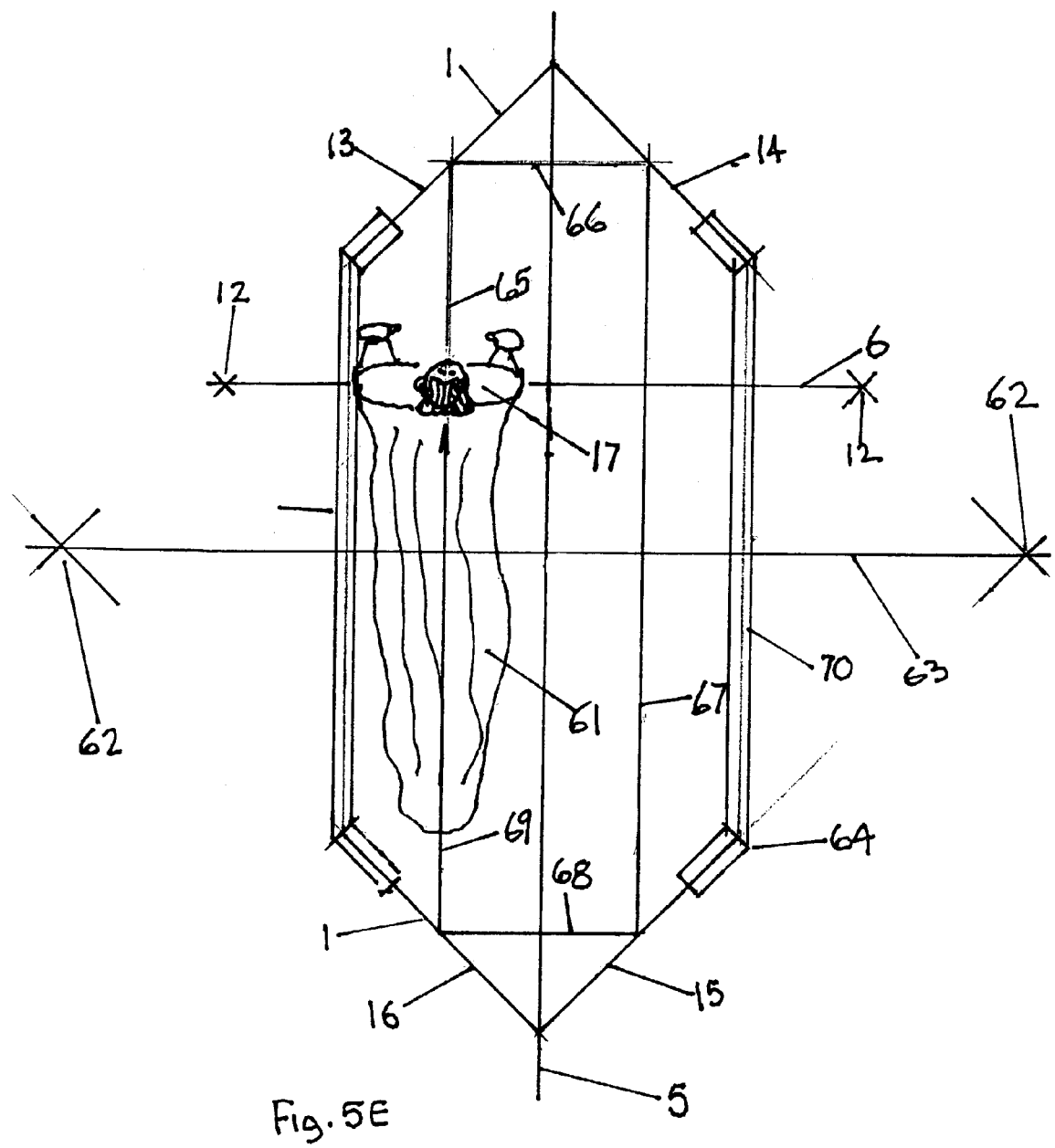

FIG. 5E—shows the expanded view of the prism system

FIG. 6A is an elevation view of the wall support for the folding prism system

FIG. 6B is a plan view showing the extension arm from the wall support.

Figure 7:
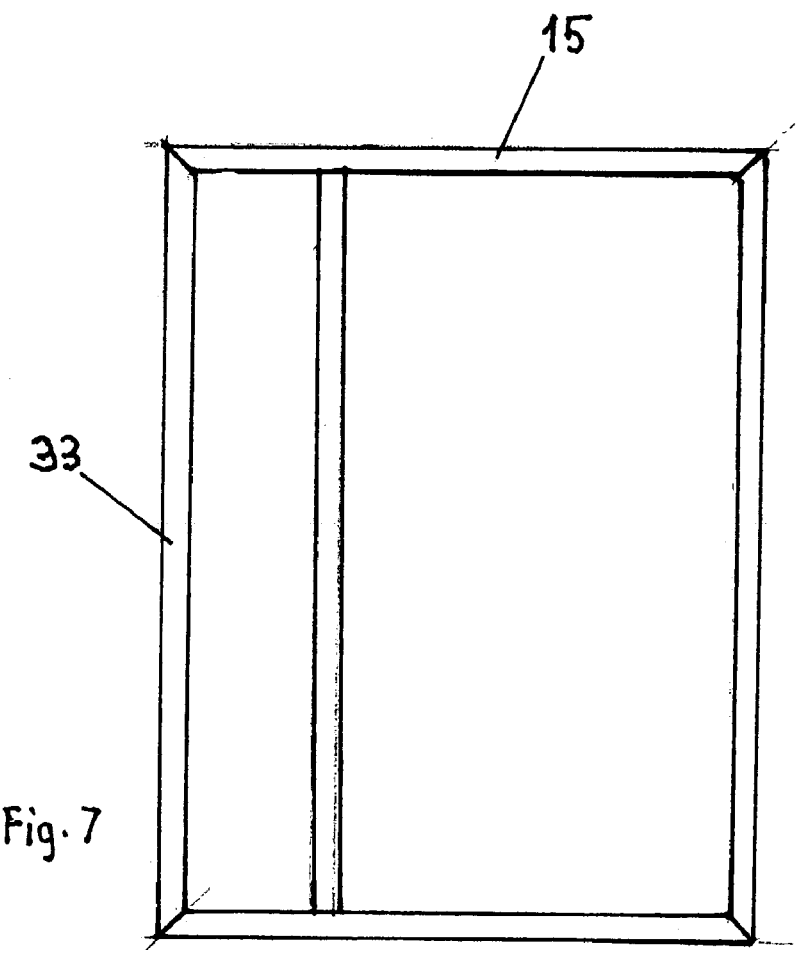

FIG. 7 is an elevation view of the third mirror frame, with extension arms

Figure 9:
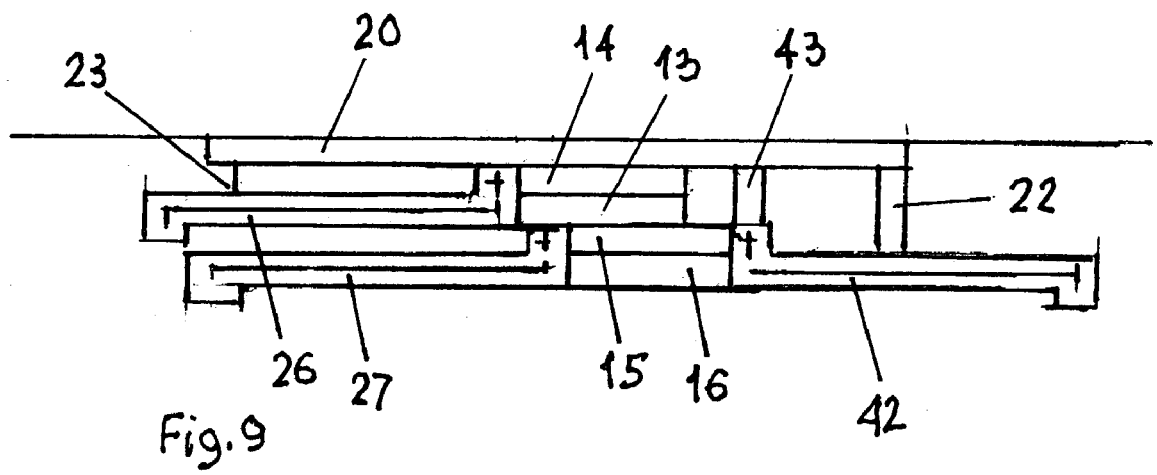

FIG. 8A is a plan view of the folding prism system, on the wall support, in the viewing position and showing the hinges for folding, with locking arms extended FIG. 8B is a plan view of the locking arm FIG. 8C is a plan view of the locking arm cam FIG. 8D is a plan view of the locking arm cam stop FIG. 9 is a plan view of the folding prism system, in the storage position and showing the locking arms which keep the mirrors at 90 degree angles to each other.

| Reference Numerals In Drawings |
|---|
| (1) frame |
| (2) mirror |
| (3) short corner angle |
| (4) long corner angle |
| (5) first reference line |
| (6) second reference line |
| (7) alignment pins |
| (8) alignment pin spacing |
| (9) distance from corner to pins |
| (10) spacing between holes - top/bottom |
| (11) alignment pins |
| (12) theoretical corner |
| (13) first mirror |
| (14) second mirror |
| (15) third mirror |
| (16) fourth mirror |
| (17) viewer |
| (18) second mirror centerline |
| (19) reference arrow |
| (20) wall frame |
| (21) holes for mounting wall frame |
| (22) arm for third mirror hinge |

| -continued |
|---|
| Reference Numerals In Drawings |
| (23) hinge for first mirror |
| (24) hinge for third mirror |
| (25) hinge for fourth mirror |
| (26) locking arm |
| (27) $2^{nd}$ locking arm |
| (33) extension arms - frame 15 |
| (34) cam |
| (35) pivot point |
| (36) pressure pad |
| (37) cam slope |
| (38) recess |
| (39) pressure pad with compressible |
| (40) locking arm cam stop |
| (41) pivot point |
| (42) $3^{rd}$ locking arm |
| (43) angle bracket |
| (44) line of sight - $1^{st}$ mirror |
| (45) to $4^{th}$ mirror |
| (46) to $3^{rd}$ mirror |
| (47) to $2^{nd}$ mirror |
| (48) to right shoulder |
| (49) line of sight - $1^{st}$ mirror |
| (50) to $2^{nd}$ mirror |
| (51) to $3^{rd}$ mirror |
| (52) to $4^{th}$ mirror |
| (53) to left shoulder |
| (54) centerline of $1^{st}$ mirror |
| (55) line of sight to mirror 2 |
| (56) line of sight to mirror 1 |
| (57) line of sight to left shoulder |
| (58) line of sight to mirror one |
| (59) line of sight to mirror 2 |
| (60) line of sight to right shoulder |
| (61) bridal gown |
| (62) new theoretical corners |
| (63) new reference line |
| (64) 45 degree angle cut |
| (65) line of sight to first mirror |
| (66) line of sight to second mirror |
| (67) line of sight to third mirror |
| (68) line of sight to fourth mirror |
| (69) line of sight of backside |
| (70) straight piece in long angle |

DETAILED DESCRIPTION

Figure 1:
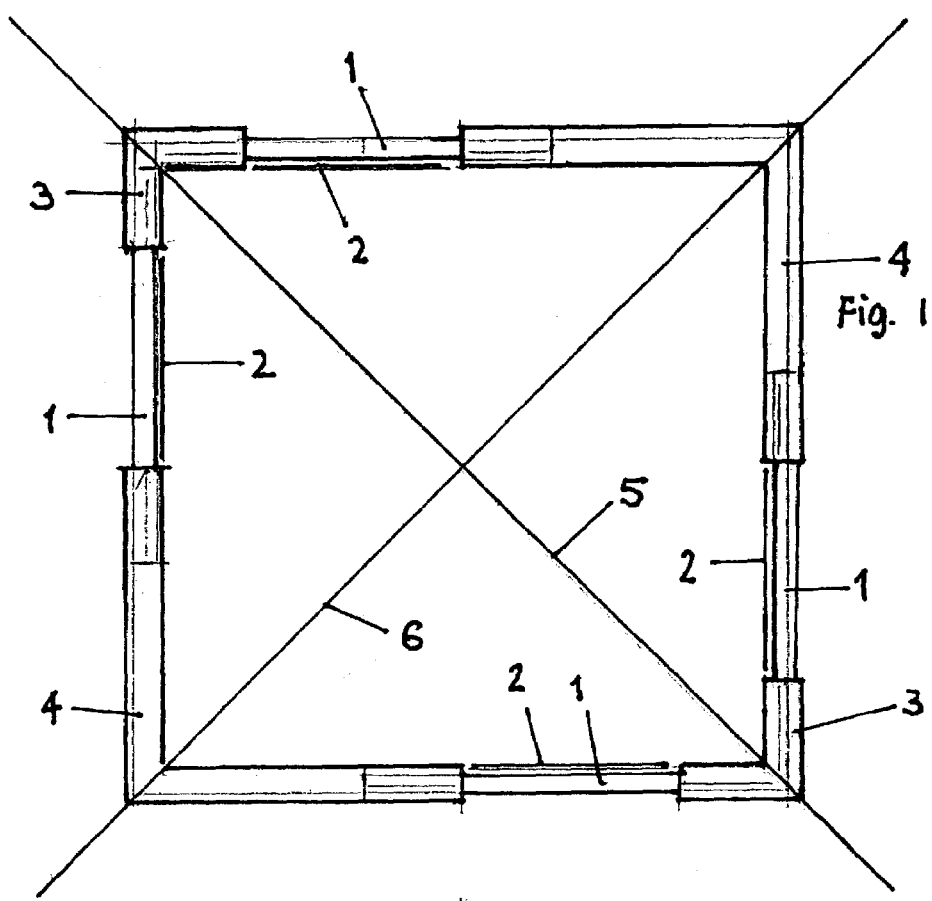
FIG. 1 is a plan view of the fixed prism structure.

Description—FIG. 1—Fixed Position Prism System

Figure 2:
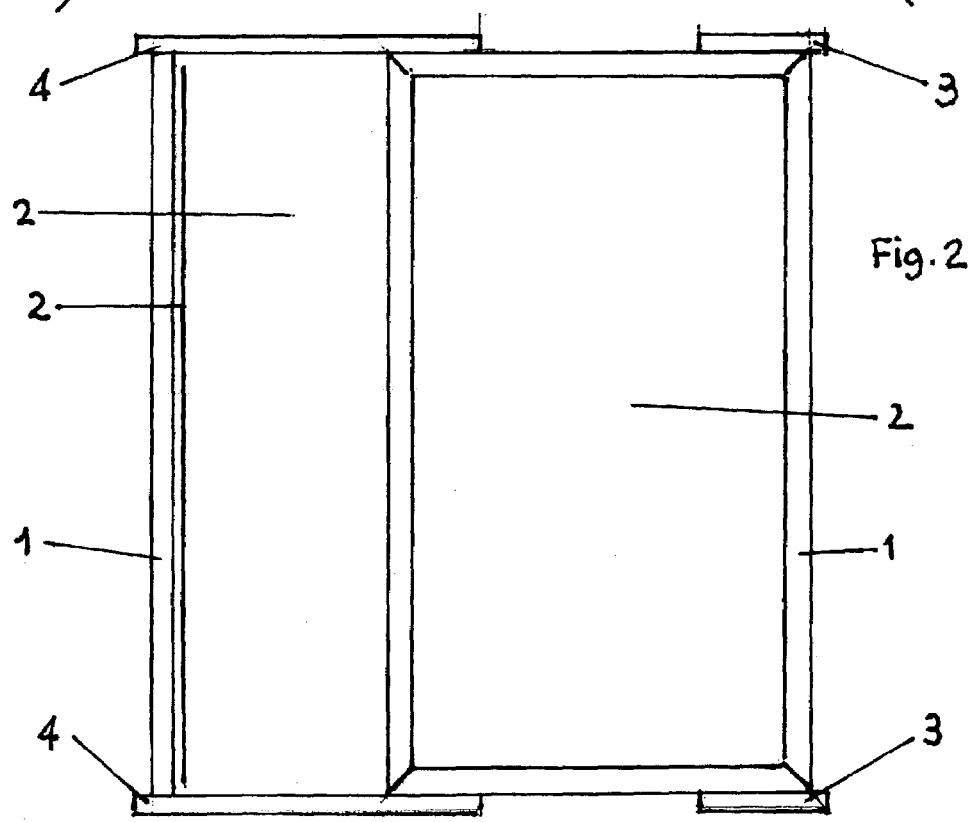
FIG. 2 is an elevation view of the fixed prism structure

A plan view of a prism system is generalized by a square formed by four frames (1), each supporting a mirror (2) and connect ed by short corner angles (3) in the opposite corners where the frames (1) come together, and long corner angles (4) where there is a separation of the frames (1). For the purposes of understanding, the scale of the frames, for this disclosure, are assumed to be four feet wide and, as shown in FIG. 2 are assumed to be seven feet tall. For the purposes of this disclosure, the square is assumed to be six and one half feet on a side. This square is formed about a reference line (5) running from one corner with short angles (3) to the opposite corner with short angles (3). This reference line (5) is important to the construction of the prism system. The 90 degree angle of the corners with short angles (3) are bisected by this reference line (5). There is a second reference line (6) which passes through one corner with long angles (4) and through the opposite corner with long angles (6). This plan view shows the frames (1) and the short corner angle (3) holding the frames (1) in 90 degree angles to each other, in close relation to each other, and the longer corner angle (4) holding the opposite frames (1) in 90 degree angles to each other, yet at a greater distance apart.

FIG. 2 is an elevation of the prism system looking into the prism. On the left of the FIG. 2 is a frame (1) supporting a mirror (2). In the center of FIG. 2 is the front surface of the mirror (2) on frame on the far side of the prism. On the far right of FIG. 2 is a frame (1) with the backside of a mirror (2) showing thru the frame (1). On the lower left and upper left of FIG. 2 are located the long angle corners (4). On the lower right and upper right corners of FIG. 2 are located the short angle corners (3).

Figure 3A:
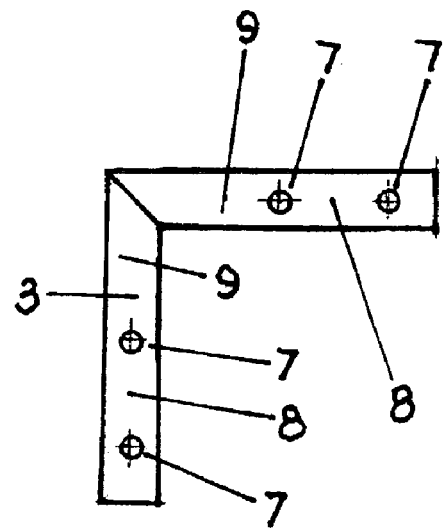
FIG. 3A is a plan view of the short corner angle

FIG. 3A is a plan view of the short corner angle (3).

Figure 3B:
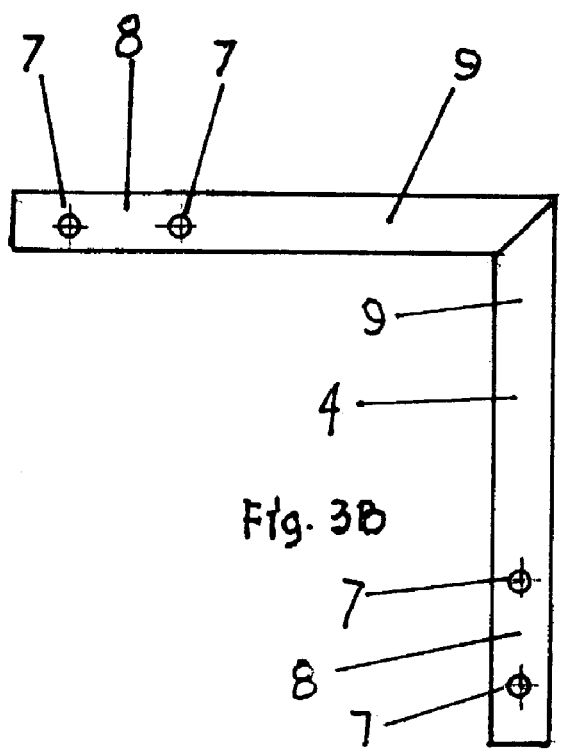
FIG. 3B is a plan view of the long corner angle

FIG. 3B is a plan view of the long corner angle (4). There are at least two alignment pins (7) in each side of each short corner angle (3) or each long corner angle (4). There are four each of the short corner angles (3), two for the top and two for the bottom positions. There are four each of the long corner angles (4), two for the top and two for the bottom. The spacing (8) between the alignment pins (7) on each arm of the angle is the same on both the short corner angles (3) and the long corner angles (4). The distance (9) from the corner of the short angle (3) and the corner of the long angle (4) to the first of the two alignment pines (7) varies with the final dimensions of the assembled prism system.

Figure 4:
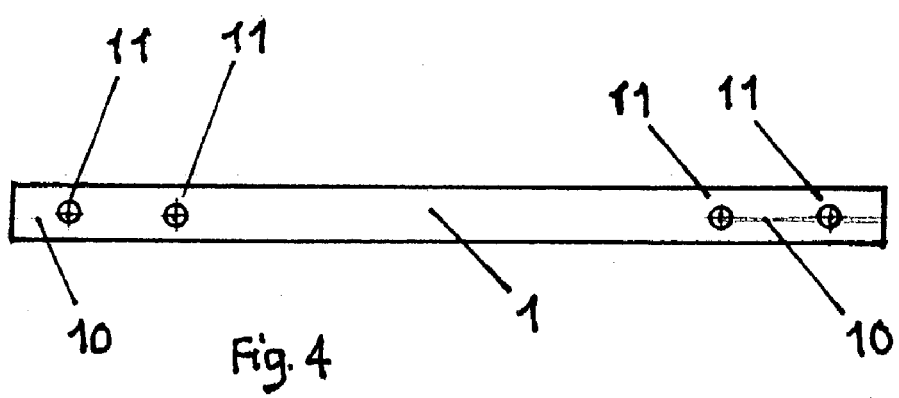
FIG. 4 is a plan view of the individual frame top or bottom

FIG. 4 is a plan view of the top or the bottom member of each frame (1) in the fixed prism structure. The spacing (10) of the holes (11) are arranged the same distance from each corner. The plan view of each and all tops or bottoms of the frames (1) are identical. The spacing (8) between the holes (11) are identical to the spacing between the pins (7) on the corner angles.

FIG. 5A is a simplified plan view indicating only the front of the mirrors (2) to define the shape and size of the prism, with the aid of cross marks to define the theoretical corners (12) of this square prism. The second reference line (6) is drawn from the opposite theoretical corners (12) For purposes of clarity, the mirrors (2) are identified from left in a clockwise motion as first mirror (13), second mirror (14), third mirror (15), and fourth mirror (16). When a viewer (17) walks along the second reference line (6) from the lower left corner of FIG. 6 toward the upper right corner until the viewer reaches a point approximating the center line (18) of the second mirror (14) and the second reference line (6). When the viewer (17) turns approximately 45 degrees to the left and directly into the second mirror (14) the viewer sees a full frontal image of her or himself. When the viewer (17) turns an additional 45 degrees to the left the viewer is presented with a full image of her or his own backside. A reference arrow (19) along the backside of the viewer is used to document the path of presentation of the backside of the viewer (17). On the fourth mirror (16) the reference arrow (19) rotates to the right. On the third mirror (15) the reference arrow (19) rotates further. On the second mirror (14) the reference arrow is further rotated. On the first mirror (13) the reference is again rotated and positioned to properly present the full, accurate backside of the viewer (17) for viewing by her or himself.

FIG. 5B—Oblique Rear Views of Viewer

When the viewer (17) moves to the centerline (54) of the first mirror (13) and stands close to it, looking to the left along line (44), there is provided an oblique view of the rear right shoulder of the viewer. The sight of the viewer (17) is reflected off the first mirror (13) along line (45) to the fourth mirror (16). The sight of the viewer is then reflected along line (46) to the third mirror (15). From the third mirror (15) the line of sight of the viewer (17) is reflected along line (47) to the second mirror (14). From the second mirror (14) the line of sight of the viewer is reflected to the right rear shoulder of the viewer.

When the viewer (17) looks to the right along line (49), there is provided an oblique view of the left rear shoulder of the viewer. The sight of the viewer (17) is reflected off the first mirror (13) along line (50) to the second mirror (14). The sight of the viewer is then reflected along line (51) to the third mirror (15). From the third mirror (15) the line of sight of the viewer (17) is reflected along line (52) to the fourth mirror (16). From the fourth mirror (16) the line of sight of the viewer is reflected to the left rear shoulder of the viewer.

FIG. 5C—Front Left Oblique View

When the viewer (17) moves alone the centerline (18) of the second mirror (14) the viewer (17) looks alone line (56) to the second mirror (14). The reflection of the line of sight is directed alone line (56) from the second mirror (14) toward the first mirror (13). The line of sight is reflected from the first mirror (13) along line (57) to the left front oblique view of the shoulder.

FIG. 5D—Front Right Oblique View

When the viewer (17) moves along the centerline (18) of the second mirror (14) and looks directly into the first mirror (13) along line (58) the line of sight will be reflected along line (59) into the second mirror (14). The line of sight will be reflected along line (60) to the right front shoulder.

FIG. 5E—Expanded View of the Prism System

To expand the prism system to allow for viewing the backside of one's own clothing when wearing a long bridal gown (61) is simple, as one knowledgeable in the art of optical physics will quickly see. The prism started as a theoretical square, even when the frames (1) did not reach to the corners. The prism remains a theoretical square, even when the floor space for the expanded prism becomes a long rectangle. The prism is divided along the original reference line (6) running from one unconnected corner (12) to the other. The original reference line (5) running from the corner of first mirror (13) and the second mirror (14) to the corner of the third mirror (15) and the fourth mirror (16) is extended to the desired length. What is important is that the 45 degree angles of the mirrors is maintained in relation to the reference line (5). Extending lines from the two sets of mirrors until they cross establishes new theoretical corners (62). From these new theoretical corners (62) is established a new reference line (63) to replace the reference line (6). To keep the two sets of the mirrors in proper relationship the original long angle (4) used to connect the two sets of mirrors has been cut at a 45 degree angle at the corner (64) of the frames (1,2,3,4). A long straight piece of metal tubing (70) of the same type as the original long angle (4) is welded between the two shortened pieces of the long angle (4). The viewer (17) looks along line (65) to the first mirror (13). The line of sight is reflected from the first mirror (13) to the second mirror (14) along line (66). The line of sight is reflected from the second mirror (14) to the third mirror (15) along line (67). The line of sight is reflected from the third mirror (15) to the fourth mirror (16) along line (68). The line of sight is reflected a final time from the fourth mirror (16) to the backside of the viewer (17) along line (69), giving a full length view of the long bridal gown (61).

FIG. 6A—Folding Position Prism System

An elevation view reveals of the wall frame (20) for mounting the folding prism system on the wall of a home or business. For the purposes of scale comparison to FIG. 1., the wall frame (20) is six and one half feet from left to right, to match the fixed position prism design, but this frame is only five feet tall. The second mirror (14) frame is centered vertically on the wall frame. The left side of second mirror (14) is aligned so that the backside of the first mirror (13) is even with the left side of the wall frame (20) when the first mirror (13) is extended to its normal open position. On top of the wall frame (20) is a right angle bracket (43) which is level with the top of the second mirror frame (14) when it is attached to the wall frame (20). This bracket serves as the pivot point mount for the 3$^{rd}$ locking arm (43).

FIG. 6B—is a plan view of the wall frame (20) showing the extension arm (22) and the right angle bracket (43) pivot point for the 3$^{rd}$ locking arm (43).

FIG. 7 is an elevation of the revised third mirror frame (15), showing that the third mirror (15) in the folding prism system is attached by extension arms (33) to move the third mirror (15) into the relevant position of the prism square and defined in FIG. 1.

FIG. 8-A is a plan view of the folding prism system, including the wall frame (20) support, and showing the hinges for folding the mirrors into the stored position. The wall frame (20) is attached to whatever wall the owner has determined is suitable. The wall frame (20) is attached by strong bolts into the structure of the building through holes (21) provided in the wall frame (20). The second mirror (14) is bolted to the wall frame (20) through bolt holes provided in both frames. There is a first mirror (13) hinge (23) which is mounted one half on the first mirror (13) and one half one the second mirror (14). The first mirror (13) is placed in the relevant positioned with the second mirror (14) and the hinge pins common to all such large hinges are placed in position to make the hinge complete. In this plan view can be seen the wall frame extension arm (22), with one half of the large hinge (24) mounted on the end of the extension arm (22). The third mirror frame (15) with it's extension arms has one half of the large hinge (24) mounted for attachment to the wall frame extension arm (22) hinge, allowing the insertion of the hinge pin to make the two components into one. On the opposite end of the third mirror frame (15) is another hinge (25) half. On the appropriate end of the fourth mirror (16) is one half of the hinge (25), which mates with the opposite end of the third mirror (15) hinge (25). Again, inserting the hinge pin makes the two components into one.

FIG. 8B is a plan view of the locking arm (26). There is a pivot point (42) for the fixed position of the locking arm (26). There is a slot (43) for the movement of the reference pin (44) on the moving member which is being controlled by this locking arm (26). There is a locking arm cam (34) which retains the reference pin (44) at the extreme end of the locking arm (26).

FIG. 8C is a plan view of the locking arm cam (34). There is a pivot point (35). There is a pressure pad (36). There is a flat cam (37) which allows the reference pin (44) to push the cam (34) sideways on the pivot point (35). There is a recess (38) which is the size of the reference pin (44) and is the stopping point for the locking arm (26). Pressure to force the system back into the folded position will cause the reference pin (44) to override the cam (37) lip.

FIG. 8D is a plan view of the locking arm cam stop (40), with anchor point (41) for attachment to the locking arm (26). There is a pressure pad (39) equipped with any compressible spring or material to act against the pressure pad (36) on the locking arm cam 34.

FIG. 9 is a plan view of the folding prism system, in the storage position. On top of the first mirror frame (13) and the second mirror frame (14) is located a locking arm (26) which prevents the frames from opening on the hinges to an angle greater than 90 degrees. On top of the third mirror frame (15) and the fourth mirror frame (16) is located another locking arm (27) which prevents these two frames from opening on the hinges to an angle greater than 90 degrees. On top of the second mirror frame (14) and the third mirror frame (15) is located a third locking arm (42) which prevents these two frames from opening on the hinges to an angle greater than 90 degrees. Around this folded prism system can be built any type of cabinet for covering the folded prism system and which can be opened for extension of the prism system for use by the viewer (17).

Advantages

From the description above, a number of advantages of our prism for viewing one's own backside become evident.

(a) The view of the backside of one's own self is seen as directly from the backside, and not from oblique or distorted view (b) The views of one's frontal image and backside images are full scale.

(c) The use of the prism does not require any adjustments (d) The prism can be housed within a small room without attachment to or structural support from the building (e) The prism can be built so as to be capable of folding into a flat configuration, allowing for the enclosure of a decorative cabinet to cover the folded prism, all in a narrow floor space.

(f) The fixed prism can be assembled by one or two persons in minutes without use of hand tools.

(g) The folding prism can be a attached to the wall of a building by one or two persons in minutes, requiring only hand tools for bolting the wall mount to the wall of the building, and a wrench to bolt the second mirror to the wall frame.

(h) Both prisms can be disassembled as easily as assembled, and when reassembled they are precisely arranged for proper presentation of the respective views.

Operation

FIG. 5A—Fixed prism system Shows the simplicity of the use of the prism for viewing one's own backside. The viewer enters thru the passage way afforded by the space between the first mirror (13) and the fourth mirror (17). The viewer turns 45 degrees to the left and sees their full scale, direct line of sight frontal image. The viewer turns an additional 45 degrees to the left and they see their full scale, direct line of sight backside image. There us no adjustment of the prism required or permitted by this invention.

FIG. 9—Folding prism system shows the simplicity of converting the folded prism system from the stored to the full use version. If there are decorative cabinets built around the folding prism system, the doors to such cabinets would be opened to permit free and full access to the stored prism system. The viewer grasps the third mirror (15) about the vertical middle section and slowly swings the third mirror (15) and the fourth mirror (16) to the right, on the hinges until the locking arm (42) stops the motion of the fourth mirror (16) in the 90 degree angle to the second mirror (14). The viewer then grasps the fourth mirror (16) at about the middle vertical section of the free swinging end and slowly pulls the fourth mirror (16) until the locking arm (27) stops the motion of the fourth mirror (16) in the 90 degree angle to the third mirror (15). The viewer then grasps the free swinging end of the first mirror (13) at about the middle vertical section and slowly swings the first mirror (13) on its hinges until the locking arm (26) stops the motion of the first mirror (13) in the 90 degree angle to the second mirror (14). The viewer then steps through the clearance between the first mirror (13) and the fourth mirror (16) and turns 45 degrees to the left to see their full frontal image. The viewer then turns an additional 45 degrees to the left and sees their full backside image. To close the folding prism system, the viewer reverses the simple opening procedure exactly and the prism is returned to the full folded position.

Conclusion, Ramification, and Scope

There is prior art which reveals interest in the solution of how to view the backside of one's own body, hair, or clothing. The patent to Short demonstrates a fundamental application for partial viewing, or even if full viewing, of one's backside, with the provision that the bottom two mirrors be adjusted every time a person of a different height than the last viewer uses the system. In some retail clothing stores there are small rooms used for examination of clothing, especially wedding gowns. The walls are covered with mirrors. None of these rooms were discovered to be constructed in the form of a theoretical square. The results in every case of over one hundred such examination rooms available was that there was no full scale backside presentation of the viewer. Without except, these mirror covered rooms presented oblique of distorted front and backside views of the viewer. Other technical devices offered interesting inventions, but none offered the ability of the invention revealed in this patent application.

The invention disclosed herein is unusual in that in a field of prior art, although somewhat limited, this invention is not preceded by any prior art for a full sized prism, capable of being entered into by a full grown human being, rendering a full scale front view of the viewer, or a full scale view of the backside of the viewer, or oblique views of the front or the backside of the viewer. Even with adjustments allowed by their disclosures, they did not provide the results if this invention.

The scope of this invention is for a device which has no prior art in the field of devices for viewing the full scale front side and the full scale backside of one's own body, without adjustments or assistance of others.

The invention claimed is:

1. A prism of mirrors for use in observing oneself, the prism comprising:
   four or more mirrors which are each supported by a frame;
   the frames operatively connected together using a series of short corner angle brackets and long corner angle brackets;
   each short corner angle bracket located opposite one another and each long corner angle bracket located opposite one another forming a four sided polygon; and
   the brackets located on the frames with pre-located alignment pins.

2. The prism of claim 1 wherein the brackets are pre assembled brackets for quick and accurate assembly of the prism.

3. A folding mirror prism system comprising:
   four or more mirrors which are each supported by a frame, each frame moveably held by locking corner angle arms located on the frames to align the mirrors facing inward with a first mirror relatively perpendicular to the second and fourth mirrors and relatively parallel to and spaced apart from a third mirror;
   the second mirror relatively parallel to and spaced apart from the fourth mirror; and
   the mirror frames moveable to allow the mirrors to move together to a position where the mirrors are relatively parallel to one another.

* * * * *